(12) United States Patent
Krishnan et al.

(10) Patent No.: US 12,535,789 B2
(45) Date of Patent: Jan. 27, 2026

(54) NESTING METHODS AND COMPUTER-CONTROLLED MACHINE TOOLS FOR CUTTING OBJECTS FROM A WORKPIECE

(71) Applicant: The Boeing Company, Arlington, VA (US)

(72) Inventors: Aravindan Krishnan, Bangalore (IN); Nayan Maiti, West Bengal (IN); Daamini Visaalaakshi, Bangalore (IN); Kishora Shetty, Bangalore (IN); Sijo Varghese, Bangalore (IN); Jeffrey D. Poskin, Black Diamond, WA (US); Sharon F. Arroyo, Sammamish, WA (US); Gunnar C. Grosenick, Kirkland, WA (US)

(73) Assignee: The Boeing Company, Arlington, VA (US)

( * ) Notice: Subject to any disclaimer, the term of this patent is extended or adjusted under 35 U.S.C. 154(b) by 393 days.

(21) Appl. No.: 18/171,199

(22) Filed: Feb. 17, 2023

(65) Prior Publication Data

US 2024/0280954 A1    Aug. 22, 2024

(51) Int. Cl.
*G05B 19/18*      (2006.01)

(52) U.S. Cl.
CPC .. *G05B 19/182* (2013.01); *G05B 2219/37087* (2013.01)

(58) Field of Classification Search
CPC .................................................. G05B 19/182
See application file for complete search history.

(56) References Cited

U.S. PATENT DOCUMENTS

| | | | | |
|---|---|---|---|---|
| 5,481,083 | A * | 1/1996 | Smyth, Jr. | B23K 26/0838 |
| | | | | 219/121.78 |
| 2004/0085580 | A1* | 5/2004 | Kelleher | G07B 17/00467 |
| | | | | 358/1.18 |
| 2007/0193655 | A1* | 8/2007 | Lee | B27B 5/065 |
| | | | | 144/348 |
| 2017/0087816 | A1* | 3/2017 | Larsen | B23P 17/00 |
| 2021/0373539 | A1* | 12/2021 | Tiedemann | G06Q 10/047 |

* cited by examiner

*Primary Examiner* — Mark A Connolly
(74) *Attorney, Agent, or Firm* — Kolitch Romano Dascenzo Gates LLP

(57) ABSTRACT

Nesting methods and computer-controlled machine tools for cutting one or more objects from a workpiece. The nesting methods aid in minimizing wasted material by assigning efficiently packed, nested locations for each object on the workpiece. The nesting methods assign locations in view of a predetermined stacking order of the objects, thereby preventing issues in subsequent manufacturing steps that would result from a substantial reordering of the objects.

20 Claims, 5 Drawing Sheets

NESTING METHODS AND COMPUTER-CONTROLLED MACHINE TOOLS FOR CUTTING OBJECTS FROM A WORKPIECE

FIELD

This disclosure relates to nesting methods and computer-controlled machine tools for cutting objects from a workpiece.

BACKGROUND

In manufacturing, optimizing the use of materials and minimizing waste is beneficial in reducing costs and increasing efficiency. In the field of machine-controlled cutting, nesting algorithms are used to arrange objects or shapes on a sheet in a space-saving manner, but known methods fail to adequately prevent subsequent manufacturing interruptions due to the possibility of the nesting algorithms rearranging the manufacturing order of parts. Accordingly, improvements can be made to increase efficiency, both at the cutting stage and in downstream manufacturing steps.

SUMMARY

The present disclosure provides systems, apparatuses, and methods relating to nesting objects and controlling a machine tool.

In some examples, a computer implemented method of assigning one or more objects a nested location on a material includes: receiving data relating to a plurality of objects to be cut out of a material by a machine tool, wherein each object has a stacking order, and wherein the machine tool comprises a cutting table defined by an X-axis and a Y-axis; and creating a nested arrangement of the plurality of objects by assigning each object a unique nested location on the material in accordance with the following constraints: the stacking order of each respective object is nondecreasing in the X-axis direction; a perimeter of each object is fully defined on the material and non-overlapping with another object; the stacking order of any pair of objects whose X-axis locations are within a predetermined distance from each other is increasing in the Y-axis direction; and the length of the nested arrangement in the X-axis direction is minimized.

In some examples, a computer-controlled machine configured to fabricate a plurality of objects from a workpiece, includes: a cutting table defined by an X-axis and a Y-axis; a controller configured to direct a cutting tool along a cutting path such that each object in the plurality of objects is cut from the workpiece, each object having a stacking order; and a data processing device having a memory with a plurality of instructions stored therein, the plurality of instructions, when executed, configured to: create the cutting path by creating a nested arrangement of the plurality of objects by assigning each object a unique nested location on the workpiece such that a perimeter of each object is fully defined on the workpiece and non-overlapping with another object; wherein the respective location of each object is assigned by nesting the objects such that the stacking order strictly increases in the X-axis direction and the stacking order of any pair of objects whose X-axis locations are within a predetermined distance from each other is increasing in the Y-axis direction; and wherein an overall length of the nested arrangement in the X-axis direction is minimized.

Features, functions, and advantages may be achieved independently in various embodiments of the present disclosure, or may be combined in yet other embodiments, further details of which can be seen with reference to the following description and drawings.

DETAILED DESCRIPTION

Figure 1:
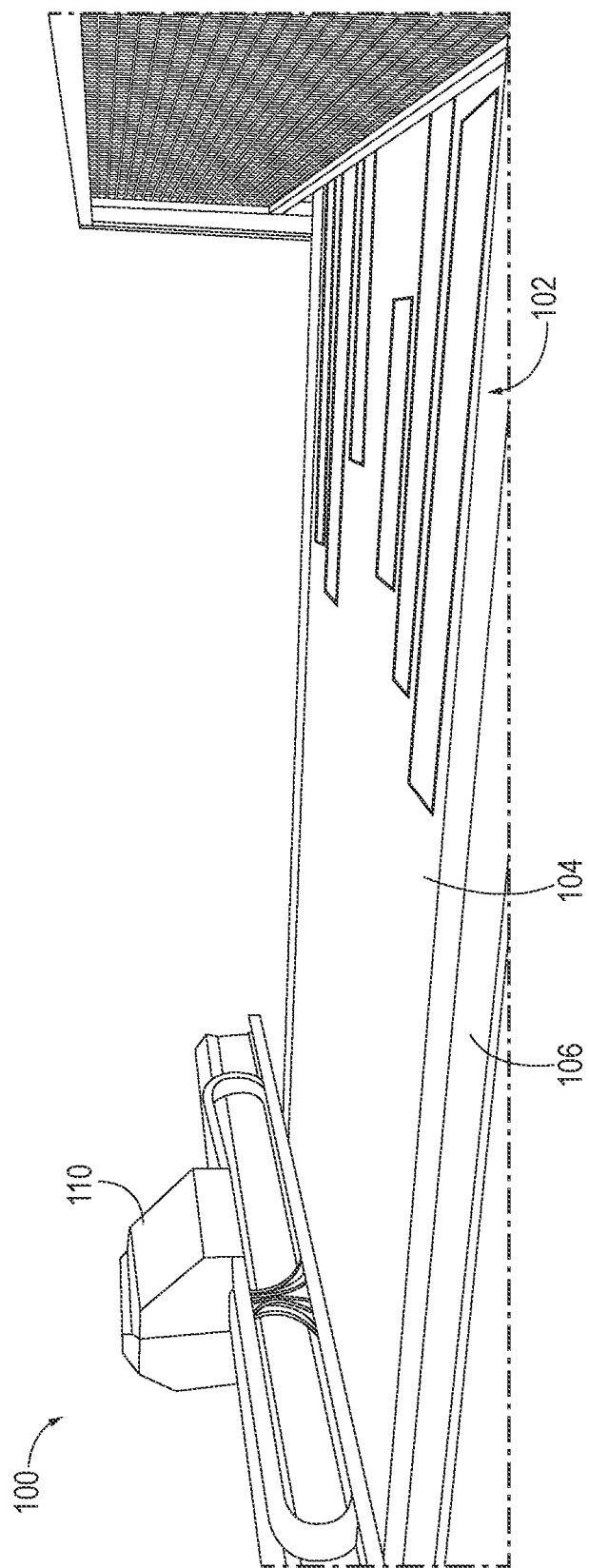
FIG. 1 depicts an illustrative machine tool in accordance with aspects of the present disclosure.

Various aspects and examples of nesting methods and machine tools, as well as related methods, are described below and illustrated in the associated drawings. Unless otherwise specified, machine tools in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Overview; (2) Examples, Components, and Alternatives; (3) Advantages, Features, and Benefits; and (4) Conclusion. The Examples, Components, and Alternatives section is further divided into subsections, each of which is labeled accordingly.

Overview

In general, computer-controlled machine tools in accordance with the present disclosure are configured to be utilized in the fabrication of one or more components and generally include a cutting tool and a cutting table. For example, the machine tool may be configured to cut one or more objects from a workpiece, cut one or more apertures into the workpiece, score portions of a workpiece, etc. In some examples, the machine tool is utilized in the manufacturing of structural components, molding components, fabric/textile components, or other suitable manufacturing applications.

The cutting table is defined by an X-axis and a Y-axis and may comprise an automatically conveying cutting table. The workpiece may be disposed on a working portion of the cutting table. In some examples, the working portion of the cutting table corresponds to all locations of the cutting table in which the cutting tool can accurately perform any cutting operations.

The cutting tool may comprise any suitable cutting implement utilized in manufacturing, such as an ultrasonic knife, an endmill, a laser cutter, a plasma cutter, etc. The cutting tool may be automatically controlled, e.g., by a programmable electronic controller, such that one or more objects can be accurately cut from a workpiece disposed on the cutting table. Generally, the cutting tool is configured to automatically move along a predetermined cutting path, e.g., such that each object can be accurately cut from the workpiece.

In some examples, objects cut from the workpiece may require quick identification after cutting, e.g., in a downstream manufacturing process. Accordingly, to facilitate identification of the objects after cutting, each object may have a unique stacking order identifier. In some examples, the stacking order identifier may be printed on the workpiece before or after cutting. Accordingly, an operator retrieving the objects after cutting may retrieve the objects from the cutting table and stack the objects in accordance with their stacking order.

The predetermined cutting path is determined by creating a nested arrangement of objects by assigning each object a nested location on the workpiece. Generally, the nested location of each object is determined by iterating through a set of constraints and identifying nested arrangements of objects that satisfy the constraints until a suitable nested arrangement is determined. In other words, a problem formulation is developed by defining the set of constraints, and the system utilizes the problem formulation to identify an arrangement of objects that satisfies the constraints.

The set of constraints may include, for example, the following: the stacking order of the objects is nondecreasing in the X-axis direction, any pair of objects whose X-axis locations are within a predetermined distance from each other have an increasing stacking order in the Y-axis direction, a perimeter of all objects is fully defined such that no two objects are overlapping and all objects are fully contained within the workpiece, and an overall length of the nested arrangement in the X-axis direction is minimized.

Aspects of the object nesting method and operation of the machine tool may be embodied as a computer method, computer system, or computer program product. Accordingly, aspects of object nesting and machine tool operation may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of object nesting and machine tool operation may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of object nesting and machine tool operation may be written in one or any combination of programming languages, including an object-oriented programming language (such as Java, C++, Python, etc.), conventional procedural programming languages (such as C), and functional programming languages (such as Haskell). Mobile apps may be developed using any suitable language, including those previously mentioned, as well as Objective-C, Swift, C #, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the object nesting and machine tool operation may be described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be programmed into or otherwise provided to processing logic (e.g., a processor of a general purpose computer, special purpose computer, field programmable gate array (FPGA), or other programmable data processing apparatus) to produce a machine, such that the (e.g., machine-readable) instructions, which execute via the processing logic, create means for implementing the functions/acts specified in the flowchart and/or block diagram block(s). "Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

Additionally or alternatively, these computer program instructions may be stored in a computer-readable medium that can direct processing logic and/or any other suitable device to function in a particular manner, such that the instructions stored in the computer-readable medium produce an article of manufacture including instructions which implement the function/act specified in the flowchart and/or block diagram block(s).

The computer program instructions can also be loaded onto processing logic and/or any other suitable device to cause a series of operational steps to be performed on the device to produce a computer-implemented process such that the executed instructions provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of object nesting and machine tool operation. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

EXAMPLES, COMPONENTS, AND ALTERNATIVES

The following sections describe selected aspects of illustrative machine tools, manufacturing methods utilizing machine tools and object nesting, as well as related systems and/or methods. The examples in these sections are intended for illustration and should not be interpreted as limiting the scope of the present disclosure only to the illustrative examples illustrated and described. Each section may include one or more distinct embodiments or examples, and/or contextual or related information, function, and/or structure.

A. Illustrative Machine Tools

Figure 2:
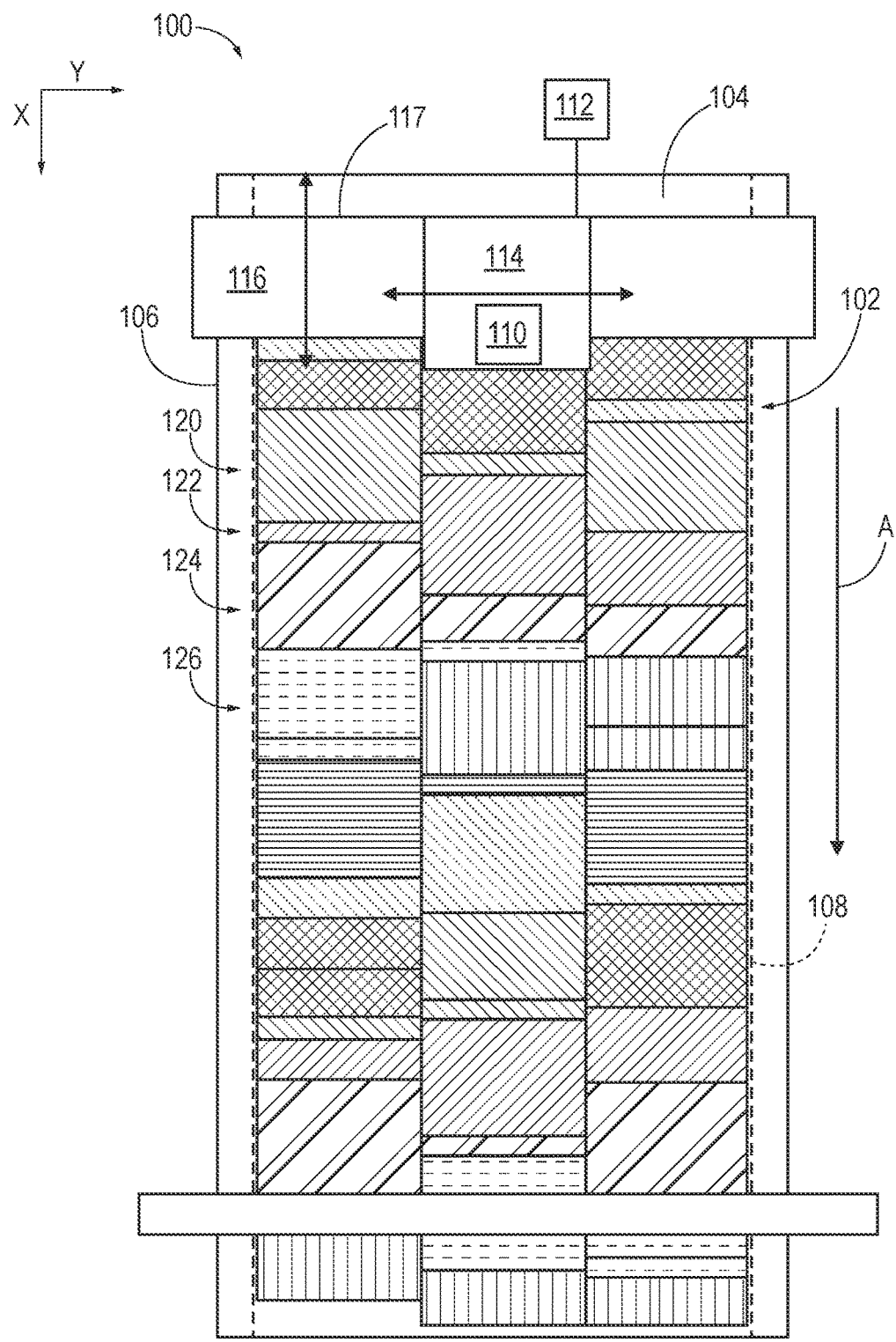
FIG. 2 is a schematic diagram representing machine tools and a workpiece in accordance with aspects of the present disclosure.
Figure 3:
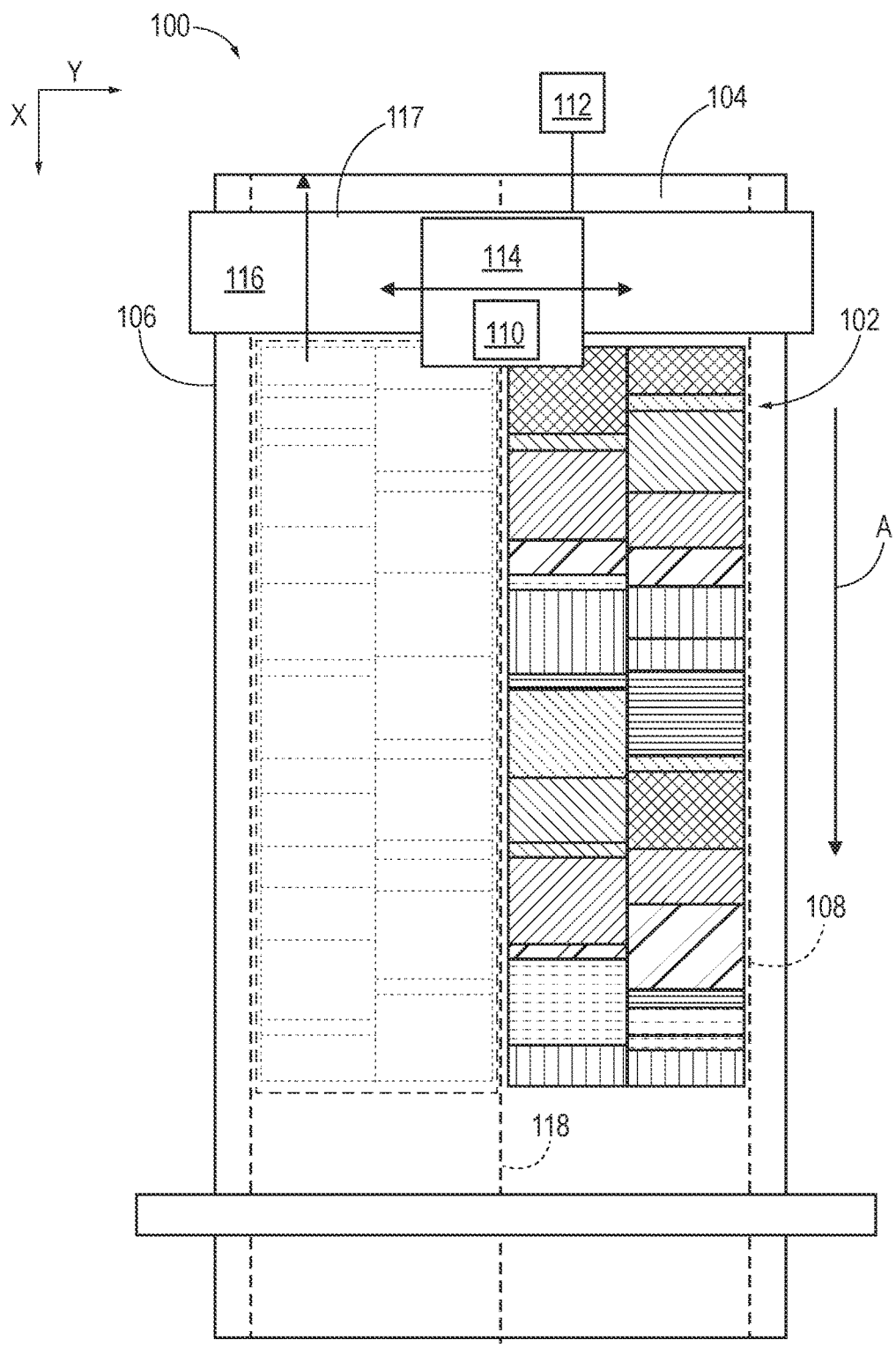
FIG. 3 is another schematic diagram representing machine tools and a workpiece in accordance with aspects of the present disclosure.

As shown in FIGS. 1-3, this section describes an illustrative computer-controlled machine tool 100. Machine tool 100 is an example of the machine tools described above.

With respect to FIG. 1, machine tool 100 is an automated, computer-controlled machine utilized in the fabrication of one or more components. More specifically, machine tool 100 is configured to cut one or more objects 102 from a workpiece 104. In some examples, machine tool 100 is utilized in the manufacturing of structural components, e.g., those utilized in aerospace applications, molding components, e.g., those utilized in lay-up manufacturing, fabric components, e.g., those utilized in textile applications, or other suitable manufacturing applications.

Machine tool 100 includes a cutting table 106. Cutting table 106 is generally defined by an X-axis and a Y-axis. In some examples, cutting table 106 comprises an automatically conveying cutting table configured to convey workpiece 104 in the direction indicated with arrow A. For example, cutting table 106 may comprise one or more automatically conveying belts, e.g., disposed on one or more rollers. Additionally, or alternatively, cutting table 106 may comprise a plurality of planar sections linked to one another with articulable linkages, a series of rollers, tracks, or other suitable conveyance device.

Cutting table 106 includes a working portion 108. Working portion 108 is defined, at least in part, by all portions of the cutting table in which workpiece 104 is accessible by a cutting tool 110 of machine tool 100. Accordingly, workpiece 104 is disposed on cutting table 106 such that an entire width of the workpiece is within working portion 108.

In the present example, workpiece 104 comprises a flexible, film material utilized in the production of aerospace components. For example, workpiece 104 may comprise a fiber-reinforced composite material such as carbon fiber reinforced plastic (CFRP), glass fiber reinforced plastic (GFRP), fiber reinforced resins, etc., or other pre-impregnated (AKA "pre-preg") composite material. As described above, workpiece 104 is sized such that an entire width of workpiece 104 is disposed within working portion 108. In some examples, workpiece 104 is provided via a roll or spool. In such examples, the workpiece may be fed from the roll/spool directly onto cutting table 106.

In general, objects 102 comprise one or more geometric shapes (e.g., polygons, etc.) configured to be cut from workpiece 104. More specifically, objects 102 have a perimeter defined by a cutting path of machine tool such that an entirety of each respective object is able to be accurately and completely cut from material. In other words, objects 102 have a general size and shape compatible with the size and shape of workpiece 104 (e.g., no object has a size and shape larger than the workpiece).

In the examples depicted in FIGS. 1-3, objects 102 are depicted with a generally rectangular shape. Accordingly, in this example, each object has a respective width (i.e., an object-width) and a respective length (i.e., an object-length). In some examples, objects 102 may have non-rectangular and/or irregular shapes, in which a maximum length and a maximum width may be measured along a major axis and/or minor axis of the shape. In some examples, the width and/or length of the shape may be measured along one or more feret diameters of the respective shape.

As shown in FIGS. 2 and 3, objects 102 are located on workpiece 104 in a nested arrangement. In other words, the respective locations of the objects are assigned such that the amount of wasted material (i.e., unused portions of workpiece 104 after cutting) is minimized. In other words, the respective locations of objects 102 are selected such that an overall area of unused portions of workpiece 104 is minimized. The nested arrangement is created, in part, by generating a predetermined cutting path for cutting tool 110.

In some examples, objects cut from the workpiece may require quick identification after cutting, e.g., in a downstream manufacturing process. Accordingly, to facilitate identification of the objects after cutting, each object may have a unique stacking order identifier. In some examples, the stacking order identifier may be printed on the workpiece before or after cutting. Accordingly, an operator retrieving the objects after cutting may retrieve the objects from the cutting table and stack the objects (e.g., for delivery to another manufacturing step) in accordance with their stacking order.

Additionally, or alternatively, objects may be categorized into one or more groups (see groups 120, 122, 124, and 126, in FIG. 2). In some examples, the categorization of the objects may aid operators in transitioning from a non-nested manufacturing scheme (i.e., one in which the objects are simply cut out in a linear order) to a nested manufacturing scheme, or from a previous nested manufacturing scheme to an alternative nested manufacturing scheme. For example, if operators are trained to retrieve objects that have been cut out of the workpiece in discrete zones, grouping of objects together helps to retain zoning while nesting and/or rearranging the position of the objects for higher efficiency and waste management.

As explained above, the predetermined cutting path is determined by creating a nested arrangement of objects by assigning each object a nested location on the workpiece. Generally, the nested location of each object is determined by iterating through a set of constraints and identifying nested arrangements of objects that satisfy the constraints until a suitable, or optimal, nested arrangement is determined.

The set of constraints may include, for example, the following: the stacking order of the objects is nondecreasing in the X-axis direction, any pair of objects whose X-axis locations are within a predetermined distance from each other have an increasing stacking order in the Y-axis direction, a respective perimeter of each object is fully defined such that no objects are overlapping and all objects are fully contained within the workpiece, and an overall length of the nested arrangement in the X-axis direction is minimized. For a more detailed description of how nested arrangements are created and analyzed see Section C below.

Cutting tool 110 is configured to be controllable by an electronic controller 112 in the X-axis direction and the Y-axis direction, such that objects 102 can be accurately cut from workpiece 104. Cutting tool 110 may comprise any suitable cutting implement utilized in manufacturing, such as an ultrasonic knife, a plasma cutter, a laser cutter, a waterjet cutter, or other suitable cutting device. Controller 112 is configured to automatically move cutting tool 110 along a predetermined cutting path such that each object can be accurately cut from the workpiece. A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

Cutting tool 110 is mounted on a controllable carriage 114 that is linearly movable along a controllable gantry 116. As shown in FIGS. 2 and 3, carriage 114 enables cutting tool 110 to move in the Y-axis direction. Similarly, gantry 116 enables cutting tool 110 to move in the X-axis direction. Carriage 114 and gantry 116 are controlled in conjunction with one another by electronic controller 112 to operate cutting tool 110 in a precise and controlled manner.

Gantry 116 comprises a substantially horizontal portion 117 spanning the width of the cutting table 106. Carriage 114 is attached to gantry 116 such that it can move along the length of horizontal portion 117. Carriage 114 and gantry 116 may be movable via one or more motors configured to provide precise and controlled movement such as servo motors, stepper motors, linear motors, belt drives, or other suitable devices.

Accordingly, by controlling the relative positions of carriage 114 and gantry 116, electronic controller 112 can direct cutting tool 110 to any location within working portion 108 of cutting table 106. In operation, electronic controller 112 is configured to direct cutting tool 110 along the predetermined cutting path such that each object is cut from the workpiece.

With reference to FIG. 3, cutting table 106 may be optionally divided into two longitudinal portions along longitudinal line 118. In some examples, the two longitudinal portions may be halves, although other ratios of the portions also may be used depending on such factors as the specific application, the height or reach of the operators, etc. In some examples, objects 102 may be assigned nested locations solely within one of the longitudinal halves to aid in operator retrieval. For example, in the case in which there is a single operator operating from one side of the cutting table, restricting object locations to the same portion of the table prevents the operator from needing to walk to the other side of the table to retrieve the objects. Furthermore, in some examples, objects may be categorized into two subgroups, each subgroup assigned a specific longitudinal portion, such that each operator may have their own subgroup of objects iterating through a subgroup-specific stacking order.

B. Illustrative Method of Manufacturing with Machine Tool

Figure 4:
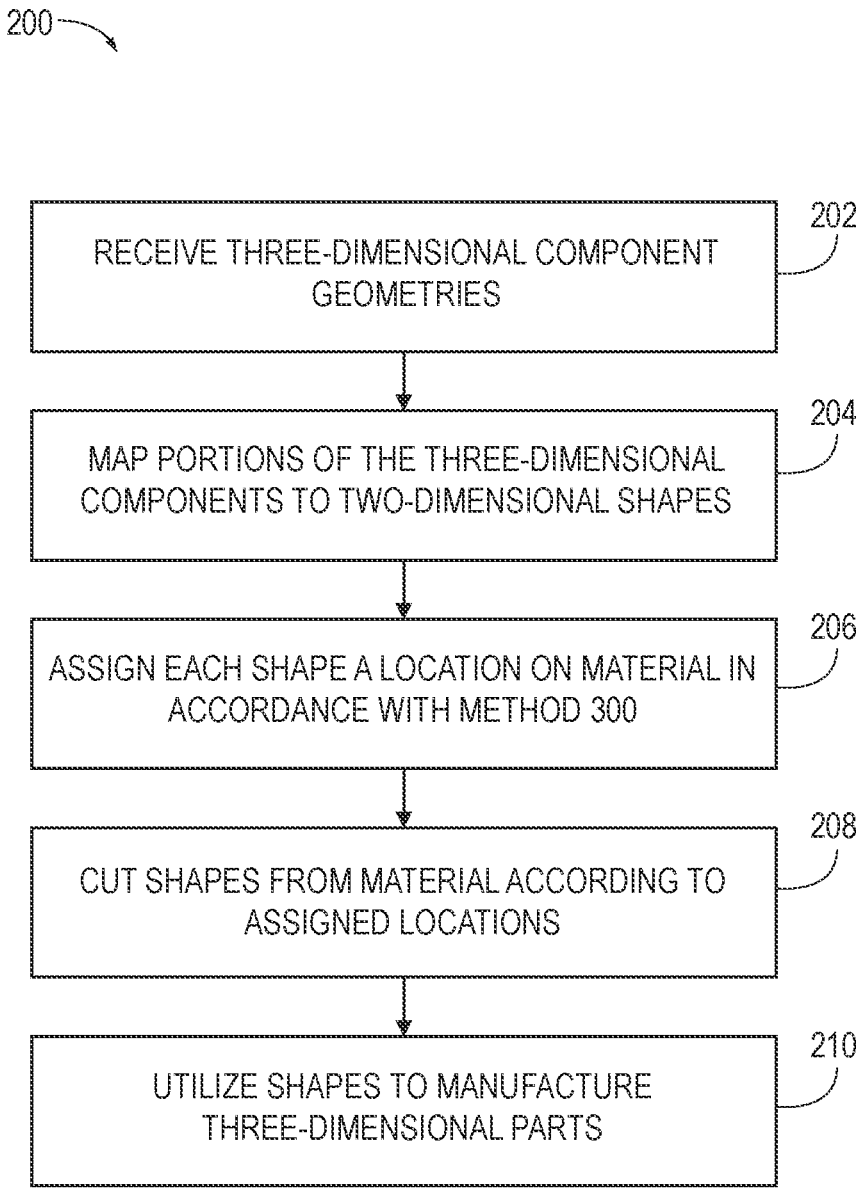
FIG. 4 is a flowchart depicting steps of methods of manufacturing three-dimensional components in accordance with aspects of the present disclosure.

This section describes steps of an illustrative method 200 for manufacture three-dimensional parts utilizing a machine tool, such as a cutting machine; see FIG. 4. Aspects of machine tool 100 may be utilized in the method steps described below. Where appropriate, reference may be made to components and systems that may be used in carrying out each step. These references are for illustration, and are not intended to limit the possible ways of carrying out any particular step of the method.

FIG. 4 is a flowchart illustrating steps performed in an illustrative method, and may not recite the complete process or all steps of the method. Although various steps of method 200 are described below and depicted in FIG. 4, the steps need not necessarily all be performed, and in some cases may be performed simultaneously or in a different order than the order shown.

Step 202 of method 200 includes receiving three-dimensional component geometries. In some examples, the three-dimensional component geometries may be manually modeled, such as with a computer-aided design (CAD) tool. Additionally, or alternatively, the three-dimensional component geometries may be generatively modeled, provided via one or more three-dimensional scans, or other otherwise provided.

Step 204 of method 200 includes mapping portions of the three-dimensional components to two-dimensional shapes. For example, portions of the three-dimensional components may be mapped to two-dimensional shapes via projection, UV mapping (e.g., unfolding, unwrapping, etc.), and/or sectioning. Step 204 may include assigning each two-dimensional shape a stacking order identifier and a group identifier.

Step 206 of method 200 includes assigning each shape a unique location on the material (i.e., workpiece). The assignment of the unique locations of each shape is determined in accordance with nesting method 300, see FIG. 4 and Section C for more information. By assigning each shape a unique location, a cutting path is generated by combining each shape's perimeter. In some examples, the perimeters are combined such that the resulting cutting path is a continuous cutting path (e.g., the cutting tool may cut along the perimeter of each shape out without lifting off of the material). In some examples, the perimeters are combined such that the resulting cutting path is a non-continuous cutting path (e.g., the cutting tool may discretely cut each respective shape out of the material).

Step 208 of method 200 includes cutting each shape from the material in accordance with the generated cutting path.

Step 210 of method 200 includes utilizing the shapes to manufacture the three-dimensional components. This step depends on the type of mapping used in step 204. For example, if the two-dimensional sections were generated via UV mapping, step 204 may comprise assembling the two-dimensional sections. In another example, if the two-dimensional sections were generated via sectioning, step 204 may comprise lamination and polymerization.

C. Illustrative Method of Assigning Objects Nested Locations for Cutting

Figure 5:
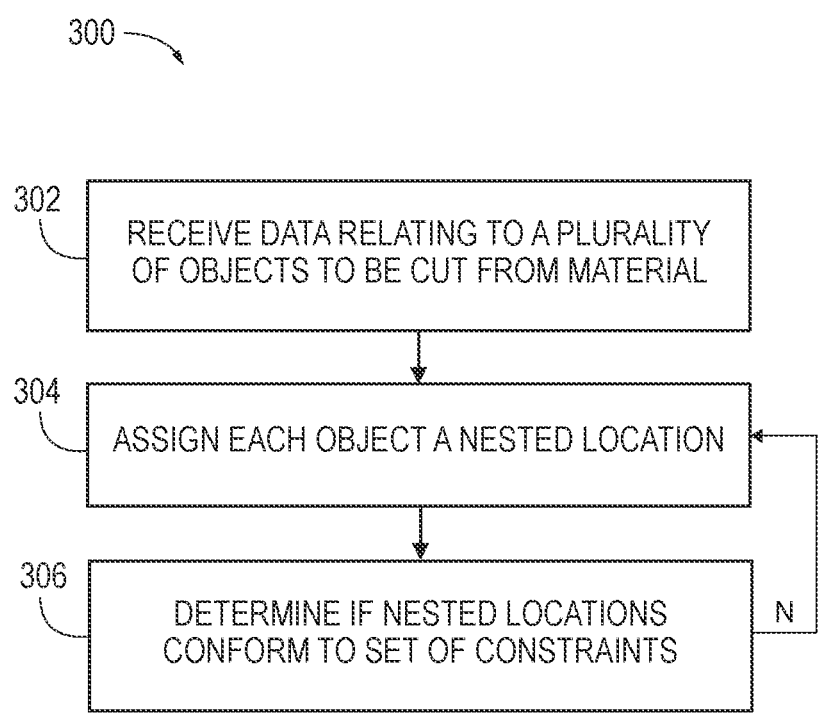
FIG. 5 is a flowchart depicting steps of methods of assigning objects nested locations in accordance with aspects of the present disclosure.

This section describes steps of an illustrative method 300 for assigning objects nested locations for cutting; see FIG. 5. Aspects of machine tool 100 and manufacturing method 200 described above, may be utilized in the method steps described below. Where appropriate, reference may be made to components and systems that may be used in carrying out each step. These references are for illustration, and are not intended to limit the possible ways of carrying out any particular step of the method.

FIG. 5 is a flowchart illustrating steps performed in an illustrative method, and may not recite the complete process or all steps of the method. Although various steps of method 300 are described below and depicted in FIG. 5, the steps need not necessarily all be performed, and in some cases may be performed simultaneously or in a different order than the order shown.

Method 300 produces an arrangement (i.e., nest) of a plurality of objects to be cut from a material (i.e., workpiece). The arrangement is created by iterating through a set of constraints and comparing them against candidate arrangements until an arrangement is found that satisfies all of the constraints or no arrangement is found. In some examples, the search is performed by repeatedly iterating through the set of constraints and narrowing down possible nested locations of each object until a single arrangement is found that minimizes a total nest-length or until a candidate arrangement is found to be optimal. In some examples, the optimality may be determined by demonstrating that all other solutions have been considered and are inferior. In some examples, the optimality may be determined through a relaxation technique, for example, by demonstrating that all other arrangements, even arrangements that have not been considered, have a measurably worse objective value.

In some examples, the search may be performed through the use of a state space search in which the set of all possible nested arrangements is explored. For example, each unique nested arrangement may be modeled as a node in a search tree and the set of constraints may be utilized to prune nodes/branches of the tree corresponding to sub-optimal arrangements and/or arrangements that fail to satisfy all of the constraints.

Step 302 of method 300 includes receiving data relating to the plurality of objects to be cut from material. The data received at this step may be generated and provided at steps 204, 206 of method 200, see Section B for a more detailed description.

Step 304 of method 300 includes creating candidate arrangements by assigning each object a unique nested location on the workpiece.

Step 306 of method 300 includes determining whether or not candidate arrangements conform to a set of constraints. In some examples, each constraint of the set of constraints comprises a condition and step 306 includes determining whether or not the candidate arrangement satisfies all of the conditions.

In some examples, the set of constraints includes the following condition: an entire perimeter of each object is defined. In other words, step 306 includes determining whether the machine tool would be able to entirely cut all of the objects from the workpiece, i.e., the objects are assigned locations entirely within the perimeter of the workpiece and no portion of any one object overlaps with another object.

In some examples, the set of constraints includes the following condition: the stacking order is nondecreasing in the X-axis direction. In other words, step 306 includes determining whether the each object has a greater stacking order than any other assigned objects with a lower X-axis location.

In some examples, the set of constraints includes the following condition: any pair of objects whose X-axis locations are within a predetermined distance from each other have an increasing stacking order in the Y-axis direction. For example, if a pair of objects are assigned X-axis locations such that they form a column or stack in the Y-axis direction (see FIGS. 2 and 3), the stacking order is increasing in the Y-axis direction. In some examples, the predetermined distance is 25% of a minimum cutting length of the objects.

In some examples, the set of constraints includes the following optional condition: the candidate arrangement places all objects having a group identifier near other objects with the same group identifier. In other words, step 306 may include determining if the candidate arrangement places objects directly adjacent (i.e., proximate) one or more other objects within the same group identifier. In some examples, step 306 optionally includes determining if no more than a single object separates the two or more objects in the same group.

In some examples, the set of constraints includes the following limitation: an overall length of the nested arrangement in the X-axis direction is minimized. In other words, step 306 includes determining whether the candidate assignment produces an arrangement that utilizes the least amount of material required to cut all of the objects.

If the candidate arrangement fails to satisfy one or more of the chosen constraints, method 300 returns to step 302 and a new candidate arrangement is created. In some examples, method 300 may continue the process of creating candidate arrangements and checking them against the set of constraints for a predetermined amount of time and/or for a predetermined number of iterations. In some examples, if no arrangement is found that adequately satisfies all constraints, method 300 may select an arrangement that most closely satisfies all constraints.

D. Illustrative Combinations and Additional Examples

This section describes additional aspects and features of nesting methods and computer-controlled machine tools, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A computer implemented method comprising:
receiving data relating to a plurality of objects to be cut out of a material by a machine tool, wherein each object has a stacking order, and wherein the machine tool comprises a cutting table defined by an X-axis and a Y-axis; and
creating a nested arrangement of the plurality of objects by assigning each object a unique nested location on the material in accordance with the following constraints:
the stacking order of each respective object is nondecreasing in the X-axis direction;
a perimeter of each object is fully defined on the material and non-overlapping with another object;
the stacking order of any pair of objects whose X-axis locations are within a predetermined distance from each other is increasing in the Y-axis direction; and
an overall length of the nested arrangement in the X-axis direction is minimized.

A1. The computer implemented method of paragraph A0, wherein the cutting table is an automatically conveying cutting table.

A2. The computer implemented method of paragraph A0 or A1, wherein the machine tool includes an ultrasonic knife.

A3. The computer implemented method of any one of paragraphs A0 through A2, wherein the material comprises a flexible film material.

A4. The computer implemented method of paragraph A3, wherein the flexible film material comprises a pre-preg composite.

A5. The computer implemented method of any one of paragraphs A0 through A4, wherein the machine tool is mounted on a controllable gantry.

A6. The computer implemented method of any one of paragraphs A0 through A5, the method further comprising generating a tool path by utilizing the perimeter of each object.

A6.1. The computer implemented method of paragraph A6, further comprising controlling the machine tool in accordance with the tool path.

A7. The computer implemented method of any one of paragraphs A0 through A6.1, further comprising selecting a selected-portion of the cutting table;
wherein assigning each object a unique nested location on the material comprises:
selecting a subset of the objects; and
nesting each object of the subset of the objects on the selected-portion of the cutting table.

A8. The computer implemented method of paragraph A7, wherein the selected-portion of the cutting table comprises a longitudinal portion of the cutting table.

A9. The computer implemented method of any one of paragraphs A0 through A8, further comprising grouping the objects into one or more groups;
wherein assigning each object a unique nested location on the material comprises nesting the plurality of objects such that the objects in a single group are proximate each other.

B0. A data processing system for generating tool paths for a cutting tool, the system comprising:
a memory; and
a plurality of instructions stored in the memory, the plurality of instructions, when executed, configured to:
receive data relating to a plurality of objects to be cut out of a material by a cutting tool, wherein each object has a stacking order, and wherein the machine tool comprises a cutting table defined by an X-axis and a Y-axis; and
generate a tool path by creating a nested arrangement of the plurality of objects by assigning each object a unique nested location on the material such that the stacking order of the plurality of objects is nondecreasing in the X-axis direction, the stacking order of any pair of objects whose X-axis locations are within a predetermined distance from each other is increasing in the Y-axis direction, and a perimeter of each object is fully defined on the material and non-overlapping with another object;
wherein an overall length of the nested arrangement in the X-axis direction is minimized.

B1. The data processing system of paragraph B0, wherein the cutting table is an automatically conveying cutting table.

B2. The data processing system of paragraph B0 or B1, wherein the cutting tool includes an ultrasonic knife.

B3. The data processing system of any one of paragraphs B0 through B2, wherein the material comprises a flexible film material.

B4. The data processing system of paragraph B3, wherein the flexible film material comprises a pre-preg composite.

B5. The data processing system of any one of paragraphs B0 through B4, wherein the cutting tool is mounted on a controllable gantry.

B6. The data processing system of any one of paragraphs B0 through B5, the method further comprising selecting a selected-portion of the cutting table;
wherein assigning each object a unique nested location comprises:
selecting a subset of the objects; and
nesting each object of the subset of objects on the selected-portion of the cutting table.

B7. The data processing system of paragraph B6, wherein the selected-portion of the cutting table comprises a longitudinal portion of the cutting table.

B8. The data processing system of any one of paragraphs B0 through B7, further comprising:
grouping the objects into one or more groups; and
wherein assigning each object a unique nested location comprises nesting the plurality of objects such that the objects in a single group are proximate each other.

C0. An automated computer-controlled machine to fabricate a plurality of objects from a workpiece, the machine comprising:
a cutting table defined by an X-axis and a Y-axis; and
a controller configured to direct a cutting tool along a predetermined cutting path such that each object in the plurality of objects is cut from the workpiece, each object having a stacking order;

wherein the predetermined cutting path is created by creating a nested arrangement of the plurality of objects by assigning each object a unique nested location on the workpiece such that a perimeter of each object is fully defined on the workpiece and non-overlapping with another object;

wherein the respective location of each object is assigned by nesting the objects such that the stacking order is nondecreasing in the X-axis direction;

wherein the stacking order of any pair of objects whose X-axis locations are within a predetermined distance from each other is increasing in the Y-axis direction; and wherein an overall length of the nested arrangement in the X-axis direction is minimized.

C1. The automated computer-controlled machine of paragraph C0, wherein the cutting table is an automatically conveying cutting table.

C2. The automated computer-controlled machine of paragraph C0 or C1, wherein the cutting tool comprises an ultrasonic knife.

C3. The automated computer-controlled machine of any one of paragraphs C0 through C2, wherein the workpiece comprises a flexible film material.

C4. The automated computer-controlled machine of paragraph C3, wherein the flexible film material comprises a pre-preg composite.

C5. The automated computer-controlled machine of any one of paragraphs C0 through C4, wherein one or more portions of the automated computer-controlled machine is mounted on a controllable gantry.

C6. The automated computer-controlled machine of any one of paragraphs C0 through C5, further comprising selecting a selected-portion of the cutting table; and
wherein assigning each object a unique nested location comprises:
selecting a subset of the objects; and
nesting each object of the subset of objects on the selected-portion of the cutting table.

C7. The automated computer-controlled machine of paragraph C6, wherein the selected-portion of the cutting table comprises a longitudinal portion of the cutting table.

C8. The automated computer-controlled machine of any one of paragraphs C0 through C7, further comprising:
grouping the objects into one or more groups;
wherein assigning each object a unique nested location comprises nesting the plurality of objects such that the objects in a single group are proximate each other.

D0. A computer-controlled machine to fabricate a plurality of objects from a workpiece, the machine comprising:
a cutting table defined by an X-axis and a Y-axis;
a controller configured to direct a cutting tool along a cutting path such that each object in the plurality of objects is cut from the workpiece, each object having a stacking order; and
a data processing device having a memory with a plurality of instructions stored therein, the plurality of instructions, when executed, configured to:
create the cutting path by creating a nested arrangement of the plurality of objects by assigning each object a unique nested location on the workpiece such that a perimeter of each object is fully defined on the workpiece and non-overlapping with another object;
wherein the respective location of each object is assigned by nesting the objects such that the stacking order is nondecreasing in the X-axis direction and the stacking order of any pair of objects whose X-axis locations are within a predetermined distance from each other is increasing in the Y-axis direction; and
wherein an overall length of the nested arrangement in X-axis direction is minimized.

D1. The computer-controlled machine of paragraph D0, wherein the cutting table is an automatically conveying cutting table.

D2. The computer-controlled machine of either D0 or D1, wherein the cutting tool comprises an ultrasonic knife.

D3. The computer-controlled machine of any one of paragraphs D0 through D2 in combination with the workpiece, wherein the workpiece comprises a flexible film material.

D4. The combination of paragraph D3, wherein the flexible film material comprises a pre-preg composite.

D5. The computer-controlled machine of any one of paragraphs D0 through D4, wherein the computer-controlled machine further comprises a controllable gantry.

D6. The computer-controlled machine of any one of paragraphs D0 through D5, wherein the plurality of instructions is further configured to select a selected-portion of the cutting table; and
wherein assigning each object a unique nested location comprises:
selecting a subset of the objects; and
nesting each object of the subset of objects on the selected-portion of the cutting table.

D7. The computer-controlled machine of paragraph D6, wherein the selected-portion of the cutting table comprises a longitudinal portion of the cutting table.

D8. The computer-controlled machine of any one of paragraphs D0 through D7, wherein the plurality of instructions is further configured to group the objects into one or more groups; and
wherein assigning each object a unique nested location comprises nesting the plurality of objects such that the objects in a single group are proximate each other.

Advantages, Features, and Benefits

The different embodiments and examples of the nesting methods and computer-controlled machine tools described herein provide several advantages over known solutions for manufacturing and efficient waste management relating to cutting. For example, illustrative embodiments and examples described herein allow a decrease in overall waste resulting from cutting objects out of a workpiece.

Additionally, and among other benefits, illustrative embodiments and examples described herein allow a decrease in downstream manufacturing interruptions resulting from possible changes in the manufacturing order of components.

Additionally, and among other benefits, illustrative embodiments and examples described herein allow for the construction of nests of objects that respect a stacking order of the objects.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A computer implemented method comprising:
receiving data relating to a plurality of objects to be cut out of a material by a machine tool, wherein each object has a stacking order, and wherein the machine tool comprises a cutting table defined by an X-axis and a Y-axis;
creating a nested arrangement of the plurality of objects by assigning each object a unique nested location on the material in accordance with the following constraints:
the stacking order of each respective object is nondecreasing in the X-axis direction;
a perimeter of each object is fully defined on the material and non-overlapping with another object;
the stacking order of any pair of objects whose X-axis locations are within a predetermined distance from each other is increasing in the Y-axis direction;
an overall length of the nested arrangement in the X-axis direction is minimized; and
grouping the plurality of objects into two or more groups, wherein the assigning each object a unique nested location on the material comprises nesting the plurality of objects such that the objects in a single group are proximate each other.

2. The computer implemented method of claim 1, the method further comprising generating a tool path by utilizing the perimeter of each object.

3. The computer implemented method of claim 2, further comprising controlling the machine tool in accordance with the tool path to cut out the plurality of objects on the cutting table.

4. The computer implemented method of claim 3, wherein the cutting table is an automatically conveying cutting table.

5. The computer implemented method of claim 3, wherein the machine tool includes an ultrasonic knife.

6. The computer implemented method of claim 3, wherein the material comprises a flexible film material.

7. The computer implemented method of claim 6, wherein the flexible film material comprises a pre-preg composite.

8. The computer implemented method of claim 3, wherein the machine tool further comprises a controllable gantry.

9. The computer implemented method of claim 1, further comprising selecting a selected-portion of the cutting table; wherein assigning each object a unique nested location on the material comprises:
selecting a subset of the objects; and
nesting each object of the subset of the objects on the selected-portion of the cutting table.

10. The computer implemented method of claim 9, wherein the selected-portion of the cutting table comprises a longitudinal portion of the cutting table.

11. The computer implemented method of claim 1, wherein the set of constraints further comprises: no more than a single object separates two or more objects in the single group.

12. A computer-controlled machine to fabricate a plurality of objects from a workpiece, the machine comprising:
a cutting table defined by an X-axis and a Y-axis;
a controller configured to direct a cutting tool along a cutting path such that each object in the plurality of objects is cut from the workpiece, each object having a stacking order; and
a data processing device having a memory with a plurality of instructions stored therein, the plurality of instructions, when executed, configured to:
group the plurality of objects into two or more groups such that each object is a member of a single group; and
create the cutting path by creating a nested arrangement of the plurality of objects by assigning each object a unique nested location on the workpiece such that a perimeter of each object is fully defined on the workpiece and non-overlapping with another object;
wherein the respective location of each object is assigned by nesting the objects such that the stacking order is nondecreasing in the X-axis direction, the stacking order of any pair of objects whose X-axis locations are within a predetermined distance from each other is increasing in the Y-axis direction, and the objects in a single group of the two or more groups are proximate each other; and
wherein an overall length of the nested arrangement in the X-axis direction is minimized.

13. The computer-controlled machine of claim 12, wherein the cutting table is an automatically conveying cutting table.

14. The computer-controlled machine of claim 12, wherein the cutting tool comprises an ultrasonic knife.

15. The computer-controlled machine of claim 12 in combination with the workpiece, wherein the workpiece comprises a flexible film material.

16. The combination of claim 15, wherein the flexible film material comprises a pre-preg composite.

17. The computer-controlled machine of claim 12, wherein the computer-controlled machine further comprises a controllable gantry.

18. The computer-controlled machine of claim 12, wherein the plurality of instructions is further configured to select a selected-portion of the cutting table; and
wherein assigning each object a unique nested location comprises:
selecting a subset of the objects; and
nesting each object of the subset of objects on the selected-portion of the cutting table.

19. The computer-controlled machine of claim 18, wherein the selected-portion of the cutting table comprises a longitudinal portion of the cutting table.

20. The computer-controlled machine of claim 12, wherein the respective location of each object is assigned by nesting the objects such that no more than a single object separates two or more objects in the single group.

* * * * *